US008914870B2

(12) United States Patent
Huang

(10) Patent No.: US 8,914,870 B2
(45) Date of Patent: Dec. 16, 2014

(54) METHODS AND ARRANGEMENTS FOR SECURITY SUPPORT FOR UNIVERSAL PLUG AND PLAY SYSTEM

(75) Inventor: Vincent Huang, Sollentuna (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 1143 days.

(21) Appl. No.: 12/599,386

(22) PCT Filed: May 8, 2007

(86) PCT No.: PCT/SE2007/050310
§ 371 (c)(1),
(2), (4) Date: Nov. 9, 2009

(87) PCT Pub. No.: WO2008/136719
PCT Pub. Date: Nov. 13, 2008

(65) Prior Publication Data
US 2010/0269169 A1    Oct. 21, 2010

(51) Int. Cl.
*G06F 15/16* (2006.01)
*H04L 12/28* (2006.01)
*H04L 29/06* (2006.01)

(52) U.S. Cl.
CPC ........ *H04L 12/2821* (2013.01); *H04L 12/2832* (2013.01); *H04L 63/0823* (2013.01); *H04L 63/101* (2013.01); *H04L 2012/2849* (2013.01)
USPC ........................................................ 726/12

(58) Field of Classification Search
USPC ........................................................ 726/12
See application file for complete search history.

(56) References Cited

U.S. PATENT DOCUMENTS

| 2002/0046349 | A1 | 4/2002 | Saito |
| 2004/0233904 | A1* | 11/2004 | Saint-Hilaire et al. ........ 370/389 |
| 2005/0188193 | A1 | 8/2005 | Kuehnel et al. |
| 2006/0112417 | A1* | 5/2006 | Son et al. ........................... 726/3 |
| 2006/0239452 | A1* | 10/2006 | Jung et al. ....................... 380/44 |
| 2007/0143488 | A1* | 6/2007 | Pantalone ..................... 709/230 |

(Continued)

FOREIGN PATENT DOCUMENTS

| WO | WO 2006/038160 A1 | 4/2006 |
| WO | WO 2006/070277 A2 | 7/2006 |
| WO | WO 2006/071468 A2 | 7/2006 |
| WO | WO 2006/115862 A1 | 11/2006 |

OTHER PUBLICATIONS

Security Console: 1 Service Template, for UPnP Device Architecture 1.0. Nov. 17, 2003, pp. 1-20.

(Continued)

*Primary Examiner* — Matthew Smithers

(57) ABSTRACT

The present invention relates to a nodes and methods for use in a Universal Plug and Play (UPnP) system to provide support for both UPnP security and mobility of security aware UPnP nodes. A gateway is arranged to provide remote access to a UPnP network to remote UPnP nodes via the gateway. The gateway comprises means for creating a virtual UPnP node for emulating internal presence of a remote UPnP node on the UPnP network. The virtual UPnP node is arranged to obtain and store security information associated with the remote UPnP node. The security information specifies how the remote UPnP node is authorized to interact with other UPnP nodes in the UPnP network. The security information may be used to filter messages from the UPnP network to the remote UPnP node.

28 Claims, 4 Drawing Sheets

(56) References Cited

U.S. PATENT DOCUMENTS

| | | | |
|---|---|---|---|
| 2007/0174282 A1* | 7/2007 | Matsuda et al. | 707/9 |
| 2007/0208948 A1* | 9/2007 | Costa-Requena et al. | 713/185 |
| 2007/0253427 A1* | 11/2007 | Stirbu | 370/395.21 |
| 2007/0254630 A1* | 11/2007 | Moloney et al. | 455/410 |
| 2007/0288487 A1* | 12/2007 | Song et al. | 707/10 |
| 2009/0252176 A1* | 10/2009 | Morita et al. | 370/401 |

OTHER PUBLICATIONS

Kumar, et al.: "Mobility Support for Universal Plug and Play (UPnP) Devices Using Session Initiation Protocol (SIP)", 2005, IEEE, pp. 788-792.

Device Security: 1 Service Template, For UPnP Device Architecture 1.0. Nov. 17, 2003, pp. 1-66.

UPnP Security Ceremonies Design Document, for UPnP Device Architecture 1.0. Oct. 3, 2003, pp. 1-18.

* cited by examiner

METHODS AND ARRANGEMENTS FOR SECURITY SUPPORT FOR UNIVERSAL PLUG AND PLAY SYSTEM

TECHNICAL FIELD

The present invention relates to methods and arrangements for security support for Universal Plug and Play (UPnP™) systems, and more particularly to methods and arrangements to support security aware mobile UPnP nodes.

BACKGROUND

Universal Plug and Play (UPnP™) is a set of protocols that defines a technology for easy-to-use, flexible, standardized connectivity between consumer electronics devices within a sub-network. With UPnP devices can automatically join the sub-network, announce their presence and service capabilities to various control points in the sub-network. UPnP is especially suitable for use within home environments. A typical application of UPnP is a local network within a home that allows for several appliances such as a TV, a mobile phone, a media player, a digital camera and a personal computer to interact using the UPnP architecture.

A UPnP network comprises UPnP devices and UPnP control points. It is possible for a UPnP device to be co-located in the same physical entity as a UPnP control point. The UPnP device provides one or several services that may be invoked to perform various actions in response to control commands. The UPnP device may for instance be a TV or a media player that is able to record and replay music or video. A UPnP control point can send control commands to UPnP devices to invoke actions on the device's services. The UPnP control point may for instance be a remote control that can be used to control a UPnP-enabled TV and media player through a UPnP network. The UPnP control points are also able to discover devices and subscribe to events that indicate state changes in the devices. The UPnP discovery protocol allows for a device to advertise its service to control points in the network and for control points to search for devices for interest within the network. This is achieved by means of exchanging discovery messages.

UPnP does not require any device drivers or a server and can therefore operate in a peer to peer mode to create and ad-hoc network. UPnP is platform independent and works with almost any type of physical wired and wireless networking media. UPnP makes use of common protocols such as TCP/IP (Transmission Control Protocol/Internet Protocol), HTTP (Hypertext Transfer Protocol), and XML (extensible Markup Language) for its underlying mechanisms. More information about UPnP can for instance be found in "UPnP™ Device Architecture 1.0" version 1.0.1, published by the UPnP Forum Dec. 2, 2003.

If a UPnP network belongs to a single user without any connections to anything outside the personal domain of the user and with no control points belonging to anyone other than the user ever being attached to the network, security is not an issue. However since network isolation is rarely the case today a concept of UPnP Security has been developed to deal with situations in which more than the user's own control points may be present on the network and able to reach the user's devices with control commands. Examples of such scenarios include households with several family members who each wish to establish an individual security domain in addition to any domain of devices and control points of a shared network environment, households in which guests might bring devices or control points into the network temporarily, or wireline or wireless networks without a firewall which may allow an attacker to access the network without the user's knowledge or permission.

UPnP Security implies the introduction of one or several Security Consoles (SC) into the network and furthermore that the devices and control points are security enabled. The SC is responsible for providing a security interface to the user, administering access control on security aware UPnP devices and for taking security ownership of devices. Each security aware device is owned by one or more SCs. The security aware device has an owner list that lists the SC(s) that own the device. Access control on the security aware device may be performed by the SC by means of an access control list (ACL) associated with the device or by means of certificates. The ACL comprises entries that specifies what actions different control points or SCs are allowed to invoke on the device. A SC that owns a device is allowed to edit the ACL of that device. The ACL is stored in the device that it is associated with and also in the SC(s) that own the device. However the ACL that is stored in the device is the one list that always is up to date. When a SC changes the ACL it will update its own copy of the ACL but since the device may be owned by several SCs that change the ACL it is possible that the ACL copies in the SCs are not updated. When a security aware device receives a request for invoking an action from a control point it will check the ACL to verify that the control point is authorized and that the action is authorized for that control point. Requests that originate from unauthorized control points or relate to unauthorized actions will be discarded.

However actions and control points may also be authorized by means of certificates. Certificates are often used for granting rights during a limited time period, while the ACL is used for granting more or less semi-permanent rights. The SC can create a certificate that authorizes a control point to invoke a certain set of actions on a device. The certificate is communicated to the control point and the device. When sending a request for an action to the device, the control point will include the certificate with the request. The device will then validate the request by comparing the certificate received from the control point with the certificate stored in the device which was previously received from the SC.

More information about UPnP security can be found in "DeviceSecurity: 1 Service Template", published by the UPnP Forum Nov. 17, 2003; "SecurityConsole: 1 Service Template", published by the UPnP Forum Nov. 17, 2003; or in "UPnP™ Security Ceremonies V1.0", published by the UPnP Forum Oct. 3, 2003.

UPnP was originally not designed to support mobility of device or control points, i.e. devices and control points were originally not allowed to move from one IP network domain to another and still maintain the UPnP interaction with other devices and control points. However the article "Mobility Support for Universal Plug and Play (UPnP) Devices Using Session Initiation Protocol (SIP)" by Kumar, B. and Rahman, M., Consumer Communications and Networking Conference, 2006. CCNC 2006. 2006 $3^{rd}$ IEEE, Volume 2, Issue, 8-10 Jan. 2006 Page(s): 788-792, propose a system level architecture to support mobility of UPnP devices. According to this proposal a UPnP Virtual Instance is created in a Home Network Gateway for each UPnP device or control point that is external from the home network and connected by means of remote access. UPnP messages are forwarded to and from the remote UPnP devices or control points using SIP (Session Initiation Protocol) signalling.

A problem with the above mentioned proposal for mobility support for UPnP is that it does not take the security aspect into consideration. The presented system level architecture presupposes a UPnP system without UPnP security.

SUMMARY

As mentioned above the there is no solution available today that provide both mobility and security support for UPnP. An object of the present invention is therefore to provide methods and arrangements for supporting security aware mobile UPnP nodes.

The above stated object is achieved by means of a gateway, a security console and methods in a gateway and security console and according to the claims.

A first embodiment of the present invention provides a gateway for giving remote access to a UPnP network to remote UPnP nodes connecting to the UPnP network via the gateway. The gateway comprises means for creating a virtual UPnP node for emulating internal presence of a remote UPnP node on the UPnP network. The virtual UPnP node is arranged to forward messages between the remote UPnP node and other UPnP nodes on the UPnP network. The virtual UPnP node is further arranged to obtain and store security information associated with the remote UPnP node. The security information specifies how the remote UPnP node is authorized to interact with the other UPnP nodes in the UPnP network.

A second embodiment of the present invention provides a method in a gateway for giving remote access to a UPnP network to remote UPnP nodes connecting to the UPnP network via the gateway. The method comprises a step of creating a virtual UPnP node for emulating internal presence of a remote UPnP node on the UPnP network. The method further comprises a step of storing security information associated with the remote UPnP node at the virtual UPnP node. The security information specifies how the remote UPnP node is authorized to interact with the other UPnP nodes in the UPnP network. In yet a further step messages between the remote UPnP node and other UPnP nodes on the UPnP network are forwarded via the virtual UPnP node.

A third embodiment of the present invention provides a security console for use in a UPnP network. The security console comprises means for receiving a request for control point authorization information from a UPnP control point in the UPnP network. The control point authorization information is information on which UPnP devices in the UPnP network the UPnP control point is authorized to give commands to and information on which actions the UPnP control point is authorized to invoke on each UPnP device. The security console also comprises means for extracting the control point authorization information from any ACLs and/or owner lists stored in the security console and means for sending the extracted control point authorization information to the UPnP control point.

A further embodiment of the present invention provides a method in a security console.

Advantages and features of embodiments of the present invention will become apparent when reading the following detailed description in conjunction with the drawings.

DETAILED DESCRIPTION

Figure 1:
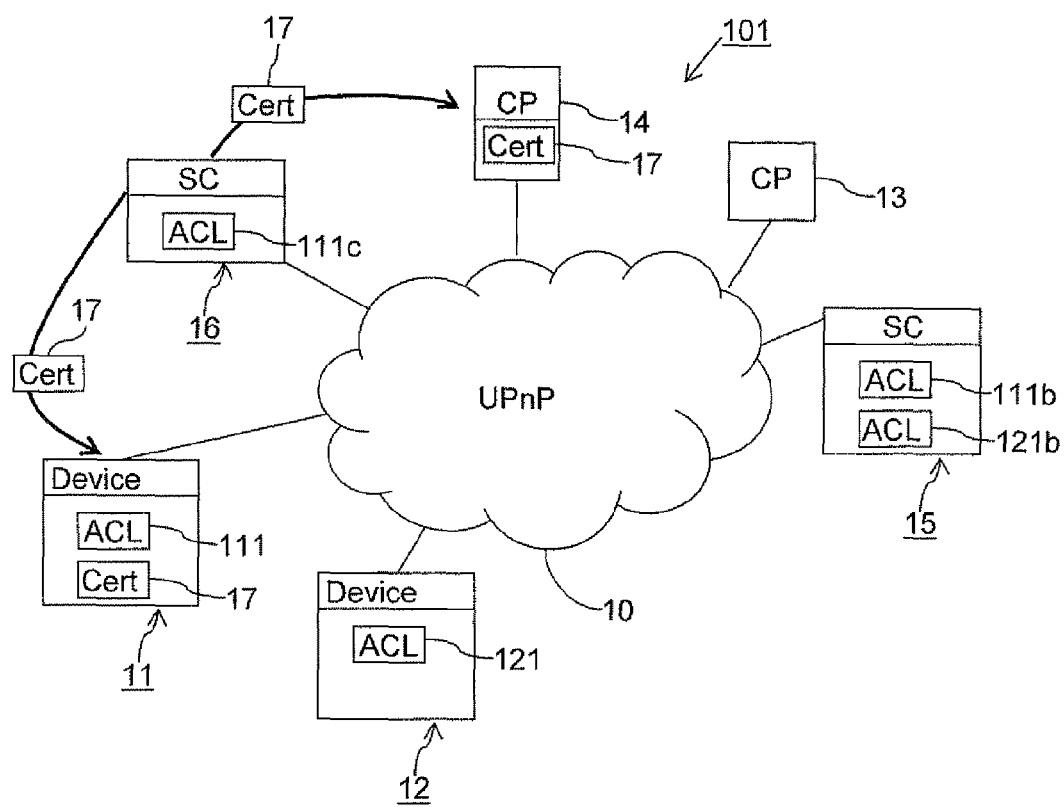
FIG. 1 is a schematic block diagram illustrating a UPnP system with support for UPnP security.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like reference signs refer to like elements.

FIG. 1 illustrates an example of a UPnP system 101 with support for UPnP security. The UPnP system 101 comprises a UPnP network 10 which is an Internet Protocol (IP) local area network (LAN). UPnP devices 11, 12 and UPnP control points 13, 14 are connected to the UPnP network. For simplicity only two devices and two control points are illustrated in FIG. 1. The number of connected devices and control points are however not limited to any specific number. The device 11 may for instance be a TV and the device 12 may for instance be a server that e.g. is able to store media files that may be replayed on the TV 11 through the network 10. The two control points 13, 14 may for instance be remote controls for controlling one or both devices 11, 12. It is also possible for a UPnP device to be co-located in the same physical entity as a UPnP control point as mentioned above.

The UPnP system 101 also includes two security consoles (SC) 15, 16 that are responsible for access control and security issues in the system as described above. In this example, let us assume that the SC 15 has security ownership of both the devices 11 and 12, while the SC 16 has security ownership of only the device 11. Each device is associated with an access control list (ACL) that comprises entries that specify the control points that are authorized to invoke actions on the associated device and the particular actions which each authorized control point has the right to invoke on the device, as well as under what conditions. The devices 11, 12 each store an updated copy 111, 121 of their respective ACL. The SCs may change the ACLs of the devices they own and store a copy of those ACLs. The SC 15 therefore stores a copy 111b of the ACL of the device 11 and a copy 121b of the ACL of the device 12, while the SC 16 stores a copy 111c of the ACL of the device 11. In the case when a device is owned by several SCs it is possible that the ACL copies stored at the SCs are not completely updated at all times since the ACL copy at an SC may not have been updated with an ACL change that was performed by another SC.

Apart from authorizing control points and actions by means of ACLs associated with devices it is also possible for SCs to authorize control points and actions by means of certificates. Certificates are often used when the authorization is to be valid for a limited time period and a certificate therefore usually comprises information that indicates the time of expiration of the certificate. In FIG. 1 a certificate 17, which is issued by the SC, 16 is schematically illustrated. The certificate 17 authorizes the control point 16 to invoke certain actions on the device 11 and the SC 16 will therefore communicate the certificate 17 to both the control point 16 and the device 11. When the control point sends a command to the device 11 to invoke one of the actions for which it is authorized by the certificate 17, it will include the certificate with the message to the device 11. The device 11 will validate the command by comparing the certificate received from the control point with the certificate that was previously received from the SC 16.

Throughout this application the term "UPnP node" will be used as a common name for a UPnP node or a UPnP control point. Furthermore the term "security information" will be used as a common name to refer to such UPnP security information as certificates, ACLs or owner lists.

Figure 2:
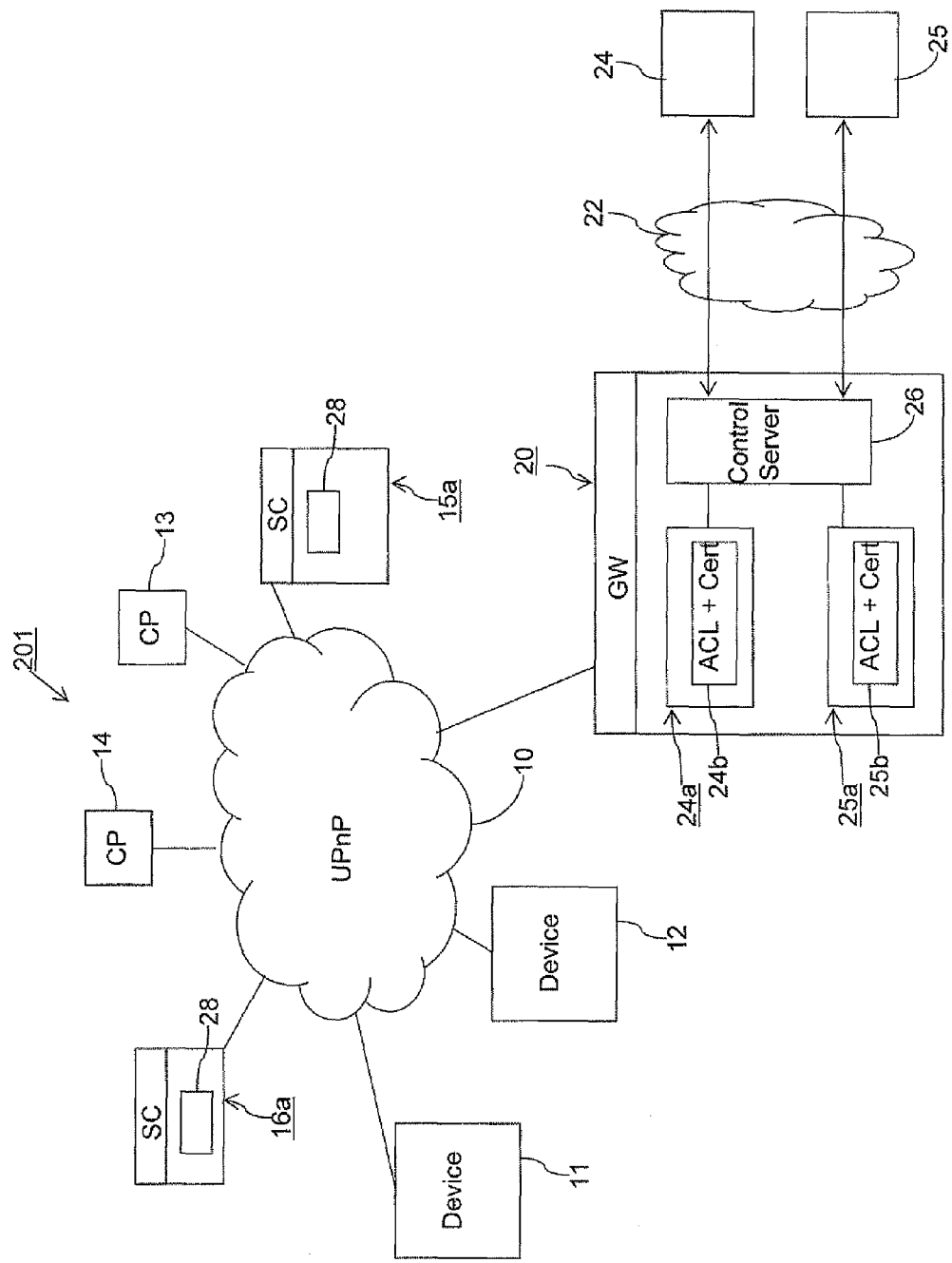
FIG. 2 is a schematic block diagram illustrating a UPnP system with support for UPnP security and UPnP node mobility according the an embodiment of the present invention.

The UPnP system 101 illustrated in FIG. 1 supports UPnP security but not UPnP node mobility. In FIG. 2 a UPnP system 201, which implements an embodiment of the present invention is illustrated. The UPnP system 201 has support for both UPnP security and UPnP node mobility. Like reference numbers are used to refer to units that correspond to those illustrated in FIG. 1 and such units will not be explained in detail. As the system 101 in FIG. 1, the UPnP system 201 comprises a UPnP network 10, two devices 11, 12 and two control points 13, 14. The system 201 also includes two SCs 15a and 16a which according to embodiments of the invention may be somewhat modified with new functionality compared to the SCs 15, 16 illustrated in FIG. 1, as will be explained in greater detail below.

To provide support for mobility of UPnP nodes the system 201 includes at least one UPnP network gateway 20 which has connections with both the private UPnP network 10 and one or several external networks 22, such as a global public network. The gateway 20 allows for UPnP nodes located outside the UPnP network 10 to connect to the network 10 by means of remote connection through the gateway. UPnP nodes connected to the UPnP network 10 via the gateway 20 will be referred to as remote UPnP nodes. In FIG. 2, two remote nodes 24, 25 which are connected to the UPnP network 10 via the external network 22 and the gateway 20, are illustrated. The remote nodes 24, 25 may for instance be mobile phones, PDAs (personal digital assistants) or some other type of electronic user equipment.

The gateway 20 includes a remote UPnP node control server 26 which includes means for communicating with remote UPnP nodes and means for creating virtual UPnP nodes associated with connected remote UPnP nodes, as will be explained in more detail below. Since it is not possible to transmit UPnP messages as such in a public network, UPnP messages between the remote UPnP nodes 24, 25 and the remote UPnP node control server will be carried by other protocols, such as SIP (Session Initiation Protocol). It is however also possible to use other protocols such as HTTP (Hypertext Transfer Protocol). The remote UPnP node control server 26 should therefore include means for terminating this other protocol that is used to carry the messages to the remote UPnP nodes 24, 25.

The remote UPnP node control server 26 will create a virtual UPnP node for each connected remote UPnP node. In this example a virtual UPnP node 24a, associated with the remote UPnP node 24 and a virtual UPnP node 25a, associated with the remote UPnP node 25, are illustrated. The virtual UPnP nodes 24a, 25a are not physical nodes, but rather instances created by software to represent the remote UPnP nodes 24, 25 in the UPnP network 10. The internal devices 11, 12 and control points 13, 14 will not be aware of that the remote UPnP nodes are connected to the network 10 by remote connection. The virtual UPnP nodes 24a, 25a will appear as any internal UPnP node to other UPnP nodes in the network. To achieve this, the virtual UPnP nodes will be associated with an IP address in the UPnP network 10.

According to the present invention it is possible for the remote UPnP nodes 24, 25 to be security aware and the virtual UPnP nodes 24a, 25a will also be security aware. The virtual UPnP nodes 24a, 25a are arranged to obtain and store security information associated with the remote UPnP nodes 24, 25. The security information is information that specifies how the remote UPnP node is authorized to interact with other UPnP nodes in the UPnP network such as ACL entries, owner lists or certificates associated with the remote UPnP nodes. The security information stored in the virtual UPnP nodes is schematically illustrated in FIG. 2 and denoted 24b and 25b respectively.

In the following it will be explained how a virtual UPnP node for a remote UPnP node may be set-up according to embodiments of the present invention in the case when the remote UPnP is a device and in the case when the remote UPnP node is a control point.

Figure 3:
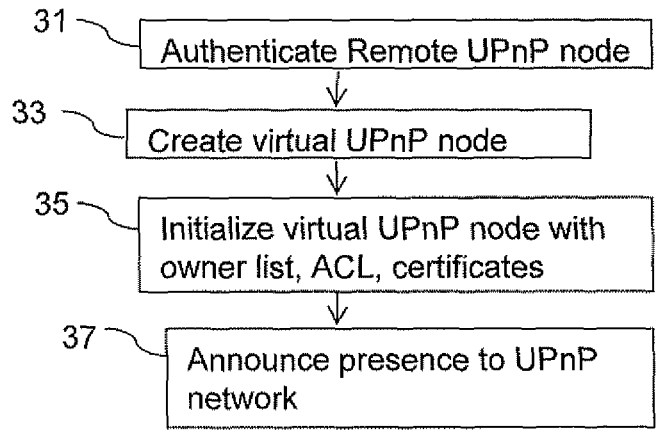
FIG. 3 is a flow chart illustrating how a virtual UPnP node for a remote UPnP device may be set-up according to an embodiment of the present invention.

Now, consider a scenario in which the remote UPnP node 24 is a security aware device, first directly connected to the UPnP network 10 and then moved outside the UPnP network 10, but is to maintain its network connection via the gateway 20. In this case the remote UPnP node 24 has already been registered with at least one of the SCs 15a, 16a. This means that the remote UPnP node 24 will already have a created owner list and ACL. FIG. 3 is a flow chart illustrating how the security aware virtual UPnP node 24a for the remote UPnP node 24 may be set-up in this case when the remote UPnP node 24 is a device.

When the remote UPnP node 24 is moved outside the UPnP network 10 it will connect to the gateway 20. In a step 31 the remote UPnP node provides the gateway 20 with information that is necessary to identify itself and the gateway will perform authentication of the remote UPnP node. The remote UPnP node has to be registered with the gateway. The information that the remote UPnP node provides to the gateway to identify itself may for instance include a username and password pair that is pre-registered in the gateway and the gateway may authenticate the remote UPnP node by comparing the information received from the remote UPnP node to the pre-registered information. In case the remote UPnP node is a mobile phone, the phone number or IMSI (International Mobile Subscriber Identity) number can also be used for authentication, provided this is available from the operator. In some proposed implementations the owner of the gateway may be an operator. Once the remote UPnP node 24 is authenticated the gateway 20 creates the virtual UPnP node 24a in a step 33. The virtual UPnP node 24a is provided with the capability to receive and send UPnP messages. The virtual UPnP node obtains a Security ID associated with the remote UPnP node 24 from the remote UPnP node and uses it as its own Security ID. Since the remote node 24a moves from the UPnP network it already has a created owner list and ACL, and it may also have certificates stored in a cache. In a step 35, the security information associated with the remote UPnP node, i.e. the owner list, ACL and any currently cached certificates, is copied from the remote UPnP node 24 to the virtual UPnP node 24a, which stores this security information. The virtual UPnP node will then announce its presence to the UPnP network 10 in a step 37. Since the virtual UPnP node uses the same Security ID as the remote UPnP node 24, it will be treated as the UPnP node 24 reconnecting to the UPnP network 10.

Figure 4:
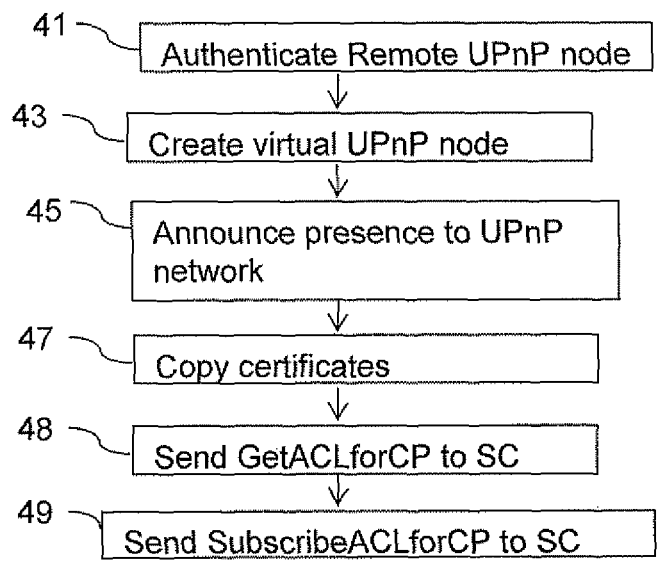
FIG. 4 is a flow chart illustrating how a virtual UPnP node for a remote UPnP control point may be set-up according to an embodiment of the present invention.

Now consider the same scenario as described above, but assume that the remote UPnP node is a control point instead of a device. FIG. 4 is a flow chart illustrating how the security aware virtual UPnP node 24a for the remote UPnP node 24 may be set-up in the case when the remote UPnP node 24 is a control point.

Just as in the case when the UPnP node was a UPnP device the remote UPnP node 24 will connect to the gateway 20 when it is moved outside the UPnP network 10. In a step 41, which is similar to the step 31 in FIG. 3 the remote UPnP node 24 provides the gateway 20 with information that is necessary to identify itself and the gateway will perform authentication of the remote UPnP node. Once the remote UPnP node 24 is authenticated the gateway 20 creates the virtual UPnP node 24a in a step 43, which is similar to step 33 in FIG. 3. The virtual UPnP node obtains a Security ID associated with the remote UPnP node 24 from the remote UPnP node and uses it as its own Security ID. Then, in a step 45 the virtual UPnP node 24a, i.e. the virtual UPnP control point presents itself to the UPnP network using the Security ID associated with the remote UPnP node 24. Since the remote UPnP node 24 has been discovered by and registered in the SCs 15a and 16a before, prior to the UPnP node moving outside the UPnP network 10, it is not necessary to register the UPnP node with the SCs again. In a step 47 any cached certificates are copied from the remote UPnP node 24 to the virtual UPnP node 24a, which stores the certificate(s) if any.

In the following steps 48 and 49 the virtual UPnP node will communicate with the SC(s) to obtain security information which normally is not available to a control point. However, according to embodiments of the invention, it may be beneficial for the virtual UPnP node to have this security information, as will be explained further below. In the step 48 the virtual UPnP node sends a command to the SC(s) to invoke an action which herein is called GetACLforCP and in step 49 the virtual UPnP node sends a command to the SC(s) to invoke an action which herein is called SubscribeACLforCP. These actions are new according to an embodiment of the invention and will be explained below.

Normally a security aware UPnP control node has limited knowledge about which actions on which devices it is authorized to invoke. UPnP security is concerned with the SOAP (Simple Object Access Protocol) control protocol and it is the UPnP devices that checks which SOAP messages are authorized and which are not and discards the messages without authorization. This means that a normal security aware control point may send a lot of messages within the UPnP network that are not authorized and thus are unnecessary since they will be discarded anyway. However when the control point is connected to the UPnP network by remote connection these unnecessary messages may be highly undesirable and problematic. The connection between the remote UPnP node and the gateway may have much less bandwidth than the available bandwidth internally within the UPnP network and the unnecessary messages may overload this connection. Therefore according to embodiments of the invention, the remote UPnP control point is prevented from sending messages that are not authorized. This is achieved by providing the virtual UPnP control point with more security information than an internal UPnP node normally would have. According to embodiments of the present invention an ACL for the remote UPnP control point is created and maintained in the virtual UPnP control point associated with the remote UPnP control point. This control point ACL can be created by means of the above mentioned two new actions.

The action GetACLforCP means that the SC responds by sending every entry for the requesting control point from all device owner lists and ACLs to create a new ACL for the control point. Since it is possible that the ACL(s) stored in the SC is not updated the SC should preferably first fetch a copy of the current ACL(s) from the associated device(s) before sorting out the entries associated with the requesting control point. The action SubscribeACLforCP performs a subscribe action. Whenever an access right in a device is modified, the SC will notify the involved control point if this control point has sent a subscribe request to the SC. The modified access right may be granted in an owner list, ACL or certificate. It will probably be easiest if the ACL and owner list entries relating to the requesting control points are copied and sent to the requesting UPnP node. However, the main issue is that the requesting control point receives information on which the identities of the devices to which the control point is authorized to give commands and the actions which are authorized for each device. The form in which this information, which herein is called control point authorization information, is communicated may vary according to different embodiments of the present invention.

Accordingly, the step 48 in FIG. 4 means that the virtual UPnP node sends a request to one or several SCs to get security information about all actions and devices that are available to the associated remote UPnP node. From this received security information an ACL is created and stored in the virtual UPnP node. In step 49, the virtual UPnP node sends a subscribe request to one or several SCs to subscribe to any added or revoked authorities for the associated remote UPnP node so that the ACL stored in the virtual UPnP node may be updated accordingly.

The above mentioned new actions are here described for use by a virtual UPnP node, but the SC can not distinguish a virtual UPnP node from any other real control point in the UPnP network. Therefore if a real control point has available memory, the two new actions are also available to the real control point, once they are implemented in the SC.

Implementation of the above mentioned GetACLforCP and SubscribeACLforCP actions in the SC will require some adaptation of a SC according to prior art. The natural choice is to implement these actions by providing the SC with new software, although implementations in firmware, hardware or combinations thereof are also feasible. In the embodiment illustrated in FIG. 2 the SCs 15a and 16a are provided with means 28 for performing the GetACLforCP and SubscribeACLforCP actions which are schematically illustrated. These means 28 would generally be implemented in software.

In the description above in connection with FIGS. 3 and 4 it was assumed that the remote UPnP node had already been connected to the UPnP network 10. In the case that the remote UPnP node is new to the UPnP network it needs to establish a security relation with one or several SCs according to the normal security setup procedure for UPnP security which e.g. is described in "UPnP™ Security Ceremonies V1.0", published by the UPnP Forum Oct. 3, 2003. All messages between the UPnP network and the UPnP node in this procedure will be forwarded to/from the remote UPnP node. The security setup procedure includes steps that should be carried out between a user and the SC and a step in which the user obtains a Security ID associated with the remote UPnP node, preferably offline. Once the remote UPnP node is registered with one or several SCs the associated virtual UPnP node will obtain and store the security information associated with the remote UPnP node as discussed above.

As mentioned above unnecessary UPnP messages that are transmitted between the remote UPnP node and the gateway may cause problems due to limited bandwidth on the connection between the remote UPnP node and the gateway. Especially if the external network 22 is a radio network the available bandwidth may be narrow. It is therefore desirable to avoid such unnecessary UPnP messages. According to preferred embodiments of the present invention the virtual UPnP nodes are arranged to filter messages between the remote UPnP node and the UPnP network to avoid unnecessary messages.

As mentioned above a normal security aware control point is not aware of which devices and services have been authorized and it can therefore send its requests to all devices. It is up to the devices to validate the messages. To eliminate the unnecessary messages to the remote UPnP node in the case when the remote UPnP node is a device, the virtual UPnP node will, according to embodiments of the present invention, check messages to the remote UPnP node from all control points against the security information stored in the virtual UPnP node. Only messages from authorized control points requesting authorized actions will be forwarded to the remote UPnP node. All other requests will be discarded. The virtual UPnP node may be arranged to check and filter the messages according to the security flow procedure that normally is carried out at a physical security aware UPnP device. The check performed at the virtual UPnP node is aimed to reduce the network traffic and is primarily not intended to replace the security check performed at the remote UPnP device. The remote UPnP device may be unaware of the filtering performed by the virtual UPnP node.

Figure 5:
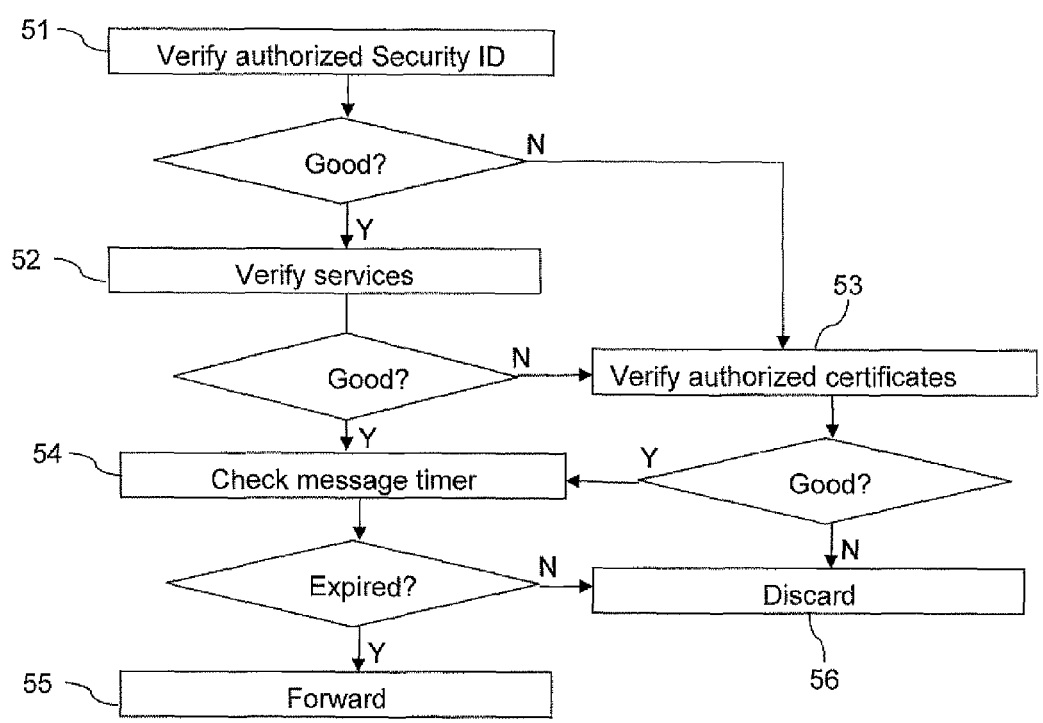
FIG. 5 is a flow chart illustrating message filtering at a virtual UPnP control point according to an embodiment of the present invention.

In the case when the remote UPnP node is a control point the associated virtual UPnP node can receive service descriptions from all devices in the UPnP network even though the remote UPnP node is not authorized to access many of the services. Therefore, it is not necessary to forward all the service descriptions to the remote UPnP node. According to preferred embodiments of the present invention, the virtual UPnP control point will filter SSDP (Simple Service Discovery Protocol) messages from all devices using the security information (i.e. any certificates and ACL) stored in the virtual UPnP control point. Only messages that relate to services for which the remote UPnP control point have been authorized will be forwarded to the remote UPnP node. This filtering will not only result in a reduction of the traffic flow from the UPnP network to the remote UPnP control point. It may also reduce the traffic flow in the opposite direction since the remote UPnP control point will not receive information about devices and services for which it is not authorized. Not being aware of these devices and services the remote UPnP control point will not be able to send any unauthorized and unnecessary requests for these devices and services. FIG. 5 is a flow chart that illustrates how messages may be filtered at the virtual UPnP control point according an embodiment of the present invention.

When the virtual UPnP node receives a device description, it will first in a step 410 verify the Security ID using the stored ACL to see if the remote UPnP control point is authorized to interact with the device. If the remote UPnP control point is authorized to interact with the device, the virtual UPnP node will continue in a step 52 to verify that the remote UPnP control point has been authorized for the described service by checking against the stored ACL. If the verification in either step 51 or 52 fails the virtual UPnP node will in a step 53 check is there are any available certificates issued to the control point which applies for the described service. Upon successful checks in step 52 or 53, the virtual UPnP node will in a step 54 check if the same description has been sent previously. A timer is started after each forwarded service description. If the timer for the service description is expired, the service description will be forwarded to the remote UPnP node in a step 55. The check in the step 54 is made to ensure that the amount of repeated messages is reduced. The setting of the timer is affected by many factors as will be appreciated by the person skilled in the art, and will not be discussed in further detail herein. If the check in either step 53 or 54 fails the service description will be discarded in a step 56 and the virtual UPnP node will not forward the service description to the remote UPnP node. In order for the filtering to be performed correctly it is important that the virtual UPnP node is notified of any changes in the access rights of the remote UPnP node. This can be achieved by means of the SubscribeACLforCP action described above, so that the virtual UPnP nodes receives notice of any ownership, ACL or certificate modifications that concern the associated remote UPnP control node.

It is preferable that a secure communication cannel is established between that gateway and the remote UPnP node for transmitting security information such as owner list, ACL, and certificates. However, the present invention may be used with existing transmission protocols used for security. To establish a secure communication channel IPSec (Internet Protocol Security) or TLS (Transport Layer Security) may for instance be used.

An advantage of embodiments of the present invention is that support for both security and mobility of UPnP nodes are provided in the UPnP system. The remote UPnP node can be security aware and the security procedures in the UPnP network can be maintained also when the UPnP node is connected via an external network to the UPnP network.

Another advantage of embodiments of the present invention is that they are easy to implement and require limited modification in an existing UPnP network with support for UPnP security. There are no modifications required in security aware UPnP devices or control points to make use of present invention. The UPnP system should be provided with a gateway for handling of remote UPnP nodes and the SC(s) of the UPnP system may have to be provided with new functionality in order to provide security information to virtual UPnP nodes.

Yet a further advantage of preferred embodiments of the present invention is that the traffic flow between the remote UPnP node and the UPnP network may be controlled by means of filtering in the virtual UPnP network. This filtering can reduce or in some cases even eliminate unnecessary messages transmitted between the remote UPnP node and the UPnP network. Apart from saving bandwidth on the connection between the remote UPnP node and the UPnP network the filtering may also reduce unnecessary traffic within the UPnP network by controlling unnecessary messages from the remote UPnP node to other UPnP nodes in the UPnP network, thereby saving bandwidth and processing resources.

Yet another advantage of preferred embodiments of the present invention is that it provides means for providing all UPnP control points with an ACL to make them aware of authorized services. Thereby unnecessary unauthorized action commands can be avoided in the entire UPnP network and not just between internal and remote UPnP nodes.

The present invention has been described above by means of description of embodiments of the invention. However there are many modifications that are possible as will be appreciated by the person skilled in the art. The gateway according to the present invention is for instance not limited to the embodiment of the gateway 20 disclosed in FIG. 2. The functionality of the remote UPnP node control server 26 may for instance be split between several different units. In this description of the gateway only those functions that are of particular interest in view of the present invention have been described in detail.

From the description above the person skilled in the art will realize what software, firmware and/or hardware modifications are necessary and/or suitable in order to implement the different described embodiments of the present invention.

In the drawings and specification, there have been disclosed typical preferred embodiments of the invention and, although specific terms are employed, they are used in a generic and descriptive sense only and not for purposes of limitation, the scope of the invention being set forth in the following claims.

The invention claimed is:

1. A gateway for providing a remote Universal Plug and Play (UPnP) node access to a UPnP network via at least one external network, wherein the gateway comprises:
   means for creating a virtual UPnP node for emulating internal presence of the remote UPnP node on the UPnP network, wherein the virtual UPnP node is arranged to:
   obtain and store security information associated with the remote UPnP node, wherein the security information specifies how the remote UPnP node is authorized to interact with other UPnP nodes in the UPnP network; and
   filter messages received from the other UPnP nodes in the UPnP network using the security information such that only the received messages which (1) relate to the other UPnP nodes that the remote UPnP node is authorized to interact with and relate to actions that the remote UPnP node is authorized to perform or (2) relate to services that the remote UPnP node has been authorized to perform are forwarded through the at least one external network to the remote UPnP node.

2. The gateway according to claim 1, wherein the security information comprises at least one of a certificate and an access control list (ACL).

3. The gateway according to claim 1, wherein the remote UPnP node is a UPnP device.

4. The gateway according to claim 3, wherein the virtual UPnP node is arranged to obtain the security information from the remote UPnP node, and wherein the security information includes copies of an access control list (ACL) and any certificates of the remote UPnP node.

5. The gateway according to claim 3, wherein the virtual UPnP node is arranged to filter messages received from the other UPnP nodes which are UPnP control points such that only messages from authorized UPnP control points requesting authorized actions according to the security information are forwarded through the at least one external network to the remote UPnP node.

6. The gateway according to claim 1, wherein the remote UPnP node is a UPnP control point.

7. The gateway according to claim 6, wherein the security information includes copies of any certificates issued for the remote UPnP node, and wherein the virtual UPnP node is arranged to receive the copies of the certificates from the remote UPnP node.

8. The gateway according to claim 6, wherein the security information includes control point authorization information, which is information on which of the other UPnP nodes that the remote UPnP node is authorized to give commands and information on which actions the remote UPnP node is authorized to invoke on each of the other UPnP nodes, and wherein the virtual UPnP node is arranged to request the control point authorization information from at least one security console (SC) in the UPnP network.

9. The gateway according to claim 8, wherein the virtual UPnP node is further arranged to send a subscribe request to the at least one SC to subscribe to information regarding any modifications of the control point authorization information, and wherein the virtual UPnP node is arranged to update the security information according to any received information regarding a modification of the control point authorization information.

10. The gateway according to claim 6, wherein the virtual UPnP node is arranged to filter UPnP service descriptions received from the other UPnP nodes such that only service descriptions that relate to services for which the remote UPnP node is authorized according to the security information are forwarded through the at least one external network to the remote UPnP node.

11. A method in a gateway for providing a remote Universal Plug and Play (UPnP) node access to a UPnP network via at least one external network, the method comprising steps of:
   creating a virtual UPnP node for emulating internal presence of the remote UPnP node on the UPnP network,
   obtaining and storing security information associated with the remote UPnP node at the virtual UPnP node, wherein the security information specifies how the remote UPnP node is authorized to interact with other UPnP nodes in the UPnP network, and
   filtering messages received at the virtual UPnP node from the other UPnP nodes in the UPnP network using the security information such that only the received messages which (1) relate to the other UPnP nodes that the remote UPnP node is authorized to interact with and relate to actions that the remote UPnP node is authorized to perform or (2) relate to services that the remote UPnP node has been authorized to perform are forwarded through the at least one external network to the remote UPnP node.

12. The method according to claim 11, wherein the security information comprises at least one of a certificate and an access control list (ACL).

13. The method according to claim 11, wherein the remote UPnP node is a UPnP device.

14. The method according to claim 13, wherein the virtual UPnP node obtains the security information from the remote UPnP node, and wherein the security information includes copies of an access control list (ACL) and any certificates of the remote UPnP node.

15. The method according to claim 11, wherein the virtual UPnP node filters messages received from the other UPnP nodes which are UPnP control points such that only messages from authorized UPnP control points requesting authorized actions according to the stored security information are forwarded through the at least one external network to the remote UPnP node.

16. The method according to claim 11, wherein the remote UPnP node is a UPnP control point.

17. The method according to claim 16, wherein the security information includes copies of any certificates issued for the remote UPnP node, and wherein the virtual UPnP node receives the copies of the certificates from the remote UPnP node.

18. The method according to claim 16, wherein the security information includes control point authorization information, which is information on which of the other UPnP nodes that the remote UPnP node is authorized to give commands and information on which actions the remote UPnP node is authorized to invoke on each of the other UPnP nodes, and wherein the virtual UPnP node requests the control point authorization information from at least one security console (SC) in the UPnP network.

19. The method according to claim 18, wherein the virtual UPnP node sends a subscribe request to the at least one SC to subscribe to information regarding any modifications of the control point authorization information, and wherein the virtual UPnP node updates the security information according to any received information regarding a modification of the control point authorization information.

20. The method according to claim 16, wherein the virtual UPnP node filters UPnP service descriptions received from the other UPnP nodes such that only service descriptions that relate to services for which the remote UPnP node is authorized according to the security information are forwarded through the at least one external network to the remote UPnP node.

21. A security console for use in a Universal Plug and Play (UPnP) network, wherein the security console comprises:
  means for receiving a request for control point authorization information from a virtual UPnP control point emulating an internal presence of a remote UPnP control point in the UPnP network, wherein the control point authorization information is information on which UPnP devices in the UPnP network that the remote UPnP control point is authorized to give commands to and information on which actions the remote UPnP control point is authorized to invoke on each of the UPnP devices;
  means for extracting the control point authorization information from at least one of any access control lists (ACLs) and owner lists stored in the security console; and
  means for sending the control point authorization information to the virtual UPnP control point.

22. The security console according to claim 21, wherein the security console is arranged to, upon reception of the request for the control point authorization information, fetch updated copies of the at least one of the ACLs and owner lists stored in the security console from the UPnP device associated with the at least one of the ACLs and owner lists prior to extracting the control point authorization information.

23. The security console according to claim 21, wherein the security console further comprises means for receiving a request from the virtual UPnP control point for a subscription for modifications of the control point authorization information and means for creating and sending a notification message regarding a control point authorization information modification to the virtual UPnP control point from which the request for the subscription was received when a change in any ACL, owner list or certificate is made that relate to the remote UPnP control point.

24. A method in a security console in a Universal Plug and Play (UPnP) network, wherein the method comprises steps of:
  receiving a request for control point authorization information from a virtual UPnP control point emulating an internal presence of a remote UPnP control point in the UPnP network, wherein the control point authorization information is information on which UPnP devices in the UPnP network that the remote UPnP control point is authorized to give commands to and information on which actions the remote UPnP control point is authorized to invoke on each of the UPnP devices;
  extracting the control point authorization information from at least one of any access control lists (ACLs) and owner lists stored in the security console; and
  sending the control point authorization information to the virtual UPnP control point.

25. The method according to claim 24, wherein the security console, upon reception of a request for the control point authorization information, fetches updated copies of the at least one of the ACLs and owner lists stored in the security console from the UPnP device associated with the at least one of the ACLs and owner lists prior to extracting the control point authorization information.

26. The method according to claim 24, wherein the method further comprises the step of receiving a request from the virtual UPnP control point for a subscription for modifications of the control point authorization information and the step of creating and sending a notification message regarding a control point authorization information modification to the virtual UPnP control point from which the request for the subscription was received when a change in any ACL, owner list or certificate is made that relate to the remote UPnP control point.

27. A gateway for providing a remote Universal Plug and Play (UPnP) node access to a UPnP network via at least one external network, wherein the gateway comprises:
  at least one processor; and,
  at least one memory that stores processor-executable instructions, wherein the at least one processor interfaces with the at least one memory to execute the processor-executable instructions, whereby said gateway is operable to:
  create a virtual UPnP node for emulating internal presence of the remote UPnP node on the UPnP network, wherein the virtual UPnP node is operable to:
  obtain and store security information associated with the remote UPnP node, wherein the security information specifies how the remote UPnP node is authorized to interact with other UPnP nodes in the UPnP network; and
  filter messages received from the other UPnP nodes in the UPnP network using the security information such that only the received messages which (1) relate to the other UPnP nodes that the remote UPnP node is authorized to interact with and relate to actions that the remote UPnP node is authorized to perform or (2) relate to services that the remote UPnP node has been authorized to perform are forwarded through the at least one external network to the remote UPnP node.

28. A security console for use in a Universal Plug and Play (UPnP) network, wherein the security console comprises:
  at least one processor; and,
  at least one memory that stores processor-executable instructions, wherein the at least one processor interfaces with the at least one memory to execute the processor-executable instructions, whereby said security console is operable to:
  receive a request for control point authorization information from a virtual UPnP control point emulating an internal presence of a remote UPnP control point in the UPnP network, wherein the control point authorization information is information on which UPnP devices in the UPnP network that the remote UPnP control point is authorized to give commands to and information on which actions the remote UPnP control point is authorized to invoke on each of the UPnP devices;
  extract the control point authorization information from at least one of any access control lists (ACLs) and owner lists stored in the security console; and
  send the control point authorization information to the virtual UPnP control point.

* * * * *

UNITED STATES PATENT AND TRADEMARK OFFICE
CERTIFICATE OF CORRECTION

PATENT NO.         : 8,914,870 B2                                              Page 1 of 1
APPLICATION NO.    : 12/599386
DATED              : December 16, 2014
INVENTOR(S)        : Huang It is certified that error appears in the above-identified patent and that said Letters Patent is hereby corrected as shown below:

In the Specification
In Column 1, below Title, insert -- CLAIM OF PRIORITY
This application is a 371 of PCT/SE2007/050310 filed on May 8, 2007, the disclosure of which is fully incorporated herein by reference. --.

In Column 3, Line 67, delete "the an" and insert -- to an --, therefor.

Signed and Sealed this
Seventeenth Day of November, 2015

Michelle K. Lee
*Director of the United States Patent and Trademark Office*